United States Patent [19]
Moate

[11] Patent Number: 5,213,135
[45] Date of Patent: May 25, 1993

[54] EMISSION CONTROL VALVE
[76] Inventor: Robert H. Moate, P.O. Box 10014 - Station 1, Houma, La. 70360
[21] Appl. No.: 860,049
[22] Filed: Mar. 26, 1992
[51] Int. Cl.[5] .................. F16K 3/08; F16K 31/54; F16K 31/16
[52] U.S. Cl. ................. 137/625.31; 251/58; 251/250
[58] Field of Search .............. 137/625.31; 251/58, 251/250

[56] References Cited
U.S. PATENT DOCUMENTS

| | | | |
|---|---|---|---|
| 3,110,323 | 11/1963 | Helguera | 137/625.31 |
| 3,195,418 | 7/1965 | Zukas | 251/250 X |
| 3,965,801 | 6/1976 | Hutchins | 251/58 X |
| 4,260,128 | 4/1981 | Tito | 251/58 |

*Primary Examiner*—Arnold Rosenthal
*Attorney, Agent, or Firm*—William David Kiesel; Robert C. Tucker; C. Dean Domingue

[57] ABSTRACT

An emission control valve is claimed which is used to control emissions into the atmosphere of a medium, such as liquids, gases, and/or solids, which is being regulated and transported. The apparatus generally comprises a valve body, a valve rack, a first and second valve member disposed within the body, disc means for allowing communication between the first and second valve members, and a pinion member for cooperating with the valve rack.

16 Claims, 4 Drawing Sheets

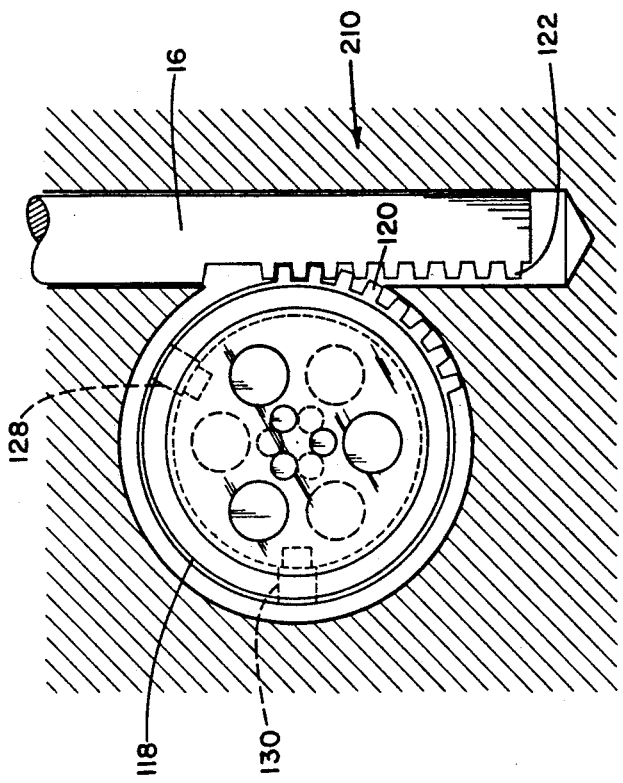
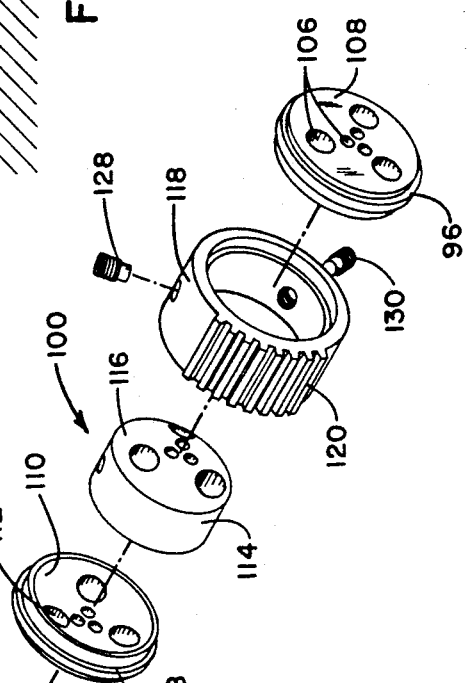
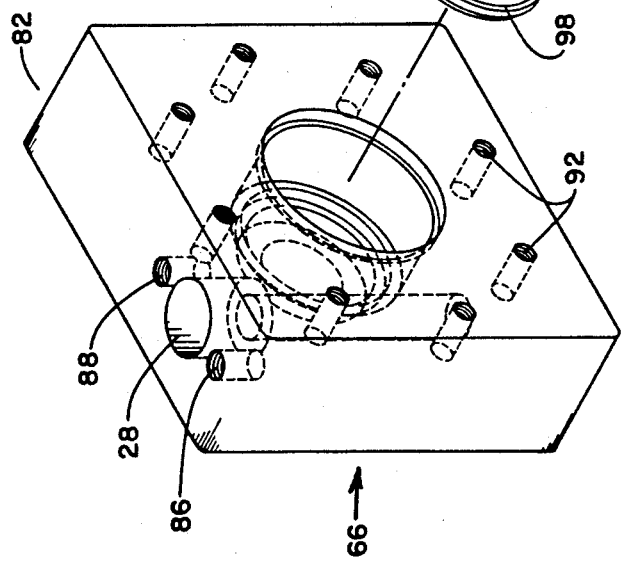

EMISSION CONTROL VALVE

BACKGROUND OF THE INVENTION

This invention relates to valves which are used to regulate the flow of gases, liquids, and/or loose materials through structures such as piping. More particularly, but not by way of limitation, this invention relates to valves which are used to control emissions into the atmosphere of the medium being regulated and transported.

Valves are used in a wide range of industries, ranging from nuclear facilities to oil and gas refineries. Generally, a valve will be used to regulate the flow of gases, liquids, or loose materials, or a combination thereof, through structures, such as piping, or through apertures by opening, closing, or obstructing ports or passageways. The various gases, liquids, or loose material being regulating may contain elements which are considered hazardous to the environment and humans.

Government agencies, on both a state and federal level, have begun to promulgate various regulations dealing with acceptable levels of emissions of hazardous gases, liquids or loose materials into the atmosphere. Valves, according to these new regulations, will contain seal means in order to prevent emission into the atmosphere of the materials being regulated. Valves containing actuator means, in order to remotely and/or automatically control operation of the valve, are particularly vulnerable to unexpected emission of the materials being transported because of the difficulty in creating a seal with the shaft of the actuator.

Therefore, there is a need in the industry for a valve which is controlled by a remote actuator that wi 1 provide a sealing means which will prevent the medium being transported from being discharged into the atmosphere. Thus, an object of this invention is a novel sealing means to effectively seal a moveable actuator shaft member.

Another object of the present invention is to have a back-up sealing chamber which will encapsulate the actuator shaft, and provide a secondary sealing means.

SUMMARY OF THE INVENTION

The present invention includes a valve with means for controlling emissions to the atmosphere. The valve includes a valve body with a first and second aperture defined therein, with the apertures being formed at perpendicular angles, and wherein the apertures intersect one another.

The valve further includes a valve rack which is slidably disposed within the second aperture. A first valve member is disposed within the valve body, with the valve member having therein a plurality of ports. A second valve member is also disposed within the valve body, with the valve member also having a plurality of ports.

A spherical, rotative disc means, which is located between the first and second valve members, are provided for allowing communication between the ports of said first and second valve member. A pinion member having the aforementioned disc means disposed therethrough is provided, with the pinion member cooperating with the rack so that as the rack moves in a longitudinal direction, the pinion member rotates allowing the openings contained on the disc means to become aligned with the ports on said first and second valve members.

The valve can further comprise an actuating means for actuating movement of the rack in either an upward or downward longitudinal movement and encapsulating means, attached between said actuating means and said valve body, for encapsulating the rack and providing a seal so that the medium being transported or regulated by the valve is not released into the atmosphere.

In one embodiment, the encapsulating means will include a seal body member having a first and second end and wherein said first end has defined therein a first port and the second end has defined therein a second port so that the rack is disposed therethrough. Also included will be first seal means, arranged about the rack in the first and second port, for sealing any emissions of the medium which is being regulated by the valve into the atmosphere.

A feature of this invention is the rotative, spherical valve member which cooperates with a set of fixed disc valve members to provide for variable opening. Another feature includes fabrication of the rotative, spherical valve member and the fixed disc valve member from metal so that in operation the valve members provide a metal-to-metal seal.

Yet another feature includes use of seal means, such as o-rings, with the aforementioned valve members to provide a sealing mechanism. Still another feature includes the ability of the variable opening valve members to open and close on solid materials and manufacturing the valve members so that the edges are grounded and tapered to mate with one another. This feature enables the valve members the ability of crushing loose material which may become lodged into the openings of the valve members. Further, this feature allows the operator the ability of variably opening the valve members to allow for incremental opening or closing, as deemed necessary and appropriate by the operator.

Still another feature includes the use of the rack and pinion as a means which rotates the rotative, spherical valve member. Still another feature is the use of encapsulating means, which is also referred to as the encasing means, to provide a secondary sealing means for the actuator shaft. Another feature includes the use of an indication means, located on the actuator shaft, for determine the relative position of the valve members. Yet another feature includes the ability of the actuator to change action from air to open, or air to close by reversing the drive rack.

Another feature includes a lockout to prevent relative movement of the actuator while the action is being changed from air to open or air to close. An advantage of the present invention is that the novel design allows for several tiers of sealing means, each a back-up to the others, in the event of failure of any of the seals. Another advantage is that the valve member construction will allow for the crushing of solids and loose materials which may become stuck in the valve. Another advantage allows for the use of this valve as an air to open, or alternatively as an air to close actuating valve. Yet another advantage is that the valve of the present invention meets the specifications of federal and state environmental agencies.

BRIEF DESCRIPTION OF THE DRAWINGS

FIG. 5 is a three-dimensional view of the disassembled valve.

FIG. 7 is a sectional view of the rack and pinion wheel of the valve member.

DESCRIPTION OF THE PREFERRED EMBODIMENT

Figure 1:
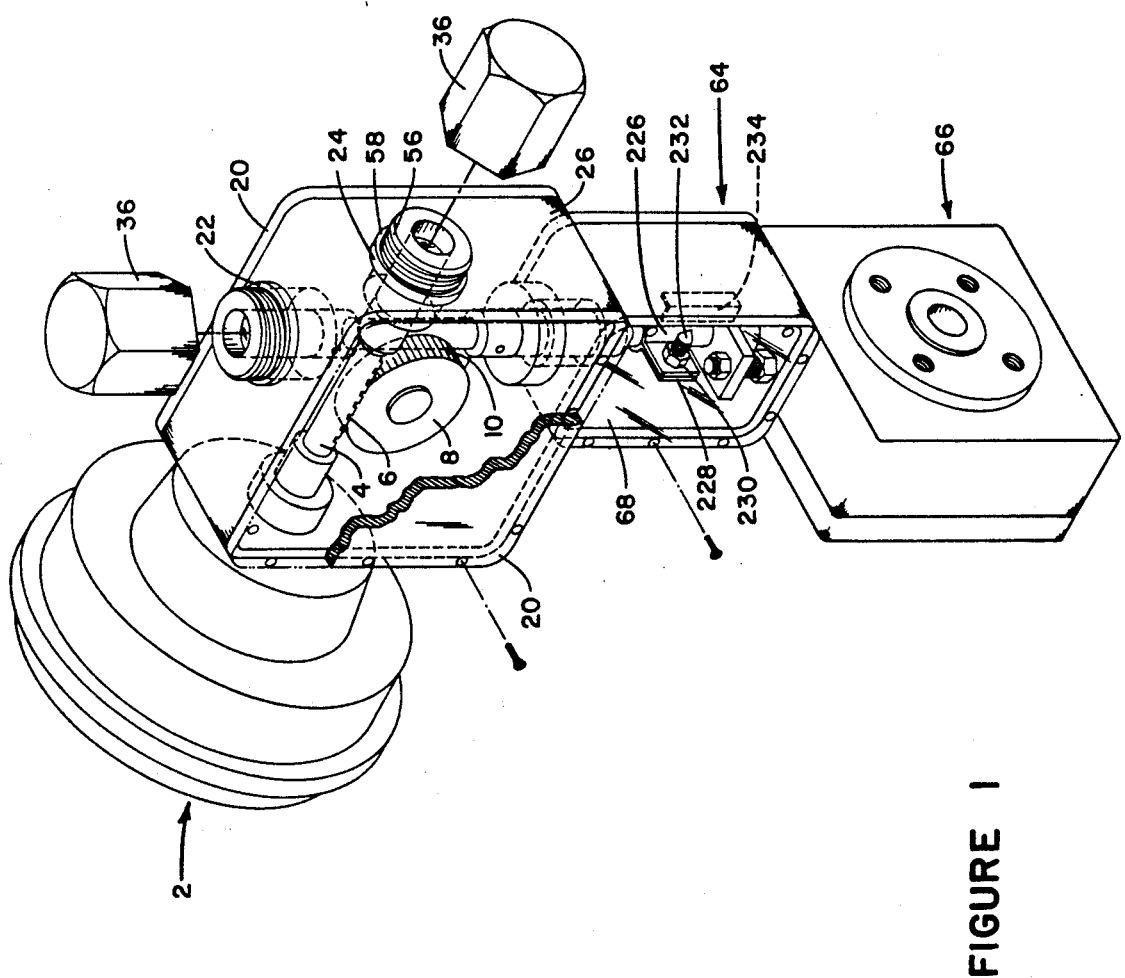
FIG. 1 is a three-dimensional, partially cut-away, view depicting the valve of the present invention.

Referring to FIG. 1, the valve of the present invention is depicted. A controller operator valve 2, sometimes known as a diaphragm operated valve, has extending therefrom an actuator shaft 4 or rack which will be responsive to an air control signal. Thus, if the controller operator valve 2 is measuring a liquid level in a separator, and a predetermined level is sensed, a pneumatic controller will send a signal which will in turn cause the actuator shaft 4 to move in a lateral direction. It should be understood that while a pneumatic type of system is described, the actuator shaft 4 could be controlled by hydraulic and/or electrical operator means, and the valve of the present invention could still be employed.

Figure 2:
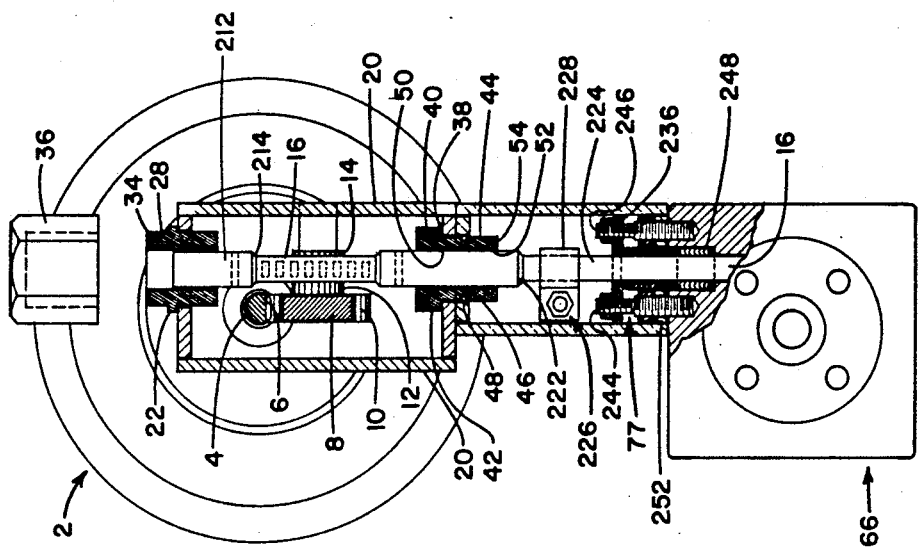
FIG. 2 is a sectional view of the valve depicting the rack and pinion of the actuator, as well as the seal means.

The rack 4 will have defined thereon teeth 6 which will cooperate with the pinion gear wheel 8, with the pinion gear wheel 8 also containing complementing teeth 10. The pinion gear wheel 8 will also contain a tubular shaft member 12 extending therefrom, this shaft member 12 having teeth 14, as seen in FIG. 2, defined thereon. Thus, as the rack 4 travels laterally, this movement will in turn impart rotational movement to the wheel 8, and shaft member 12.

The longitudinal actuator shaft 16 is also depicted in FIG. 1. The shaft 16 will contain defined thereon teeth 18 (not shown) which will cooperate with teeth 14 of shaft member 12. The shaft 16, the wheel 8 and rack 4, heretofore described, can be contained within an actuator cover means 20. The cover means 20 will be of a generally rectangular box configuration, and will have a first port 22, second port 24 and third port 26 defined thereon.

Referring to FIG. 2, port 22 will have contained therein first tubular position sub 28 having on the outer diameter a shoulder 30, as seen in FIG. 2, which abuts the actuator cover means 20. Fastening means 32 (not shown) can also be employed for fastening the position sub 28 to the actuator cover means 20. On the outer diameter of the sub 28 there is contained thread means 34 which will threadedly mate with travel stop means 36. The travel stop means is utilized to limit the travel of actuator shaft 16 so that the travel means 36 can effectively stop movement of the shaft 16 and prevent the opening and/or closing of the valve elements, as will be further described hereinafter.

A second tubular position sub 38 will be disposed within port 26. The second sub 38 will have on the outer diameter a first surface 40 which will terminate at shoulder 42, with shoulder 42 abutting the actuator cover means 20. The sub 38 will have in turn second surface 44 which will have defined therein a groove 46 for placement of o-ring 48. On the internal diameter, the sub 38 will have a bore 50 which will contain a groove 52 for placement of sealing means 54, which will sealingly engage the shaft 16.

Referring to FIG. 1 again, a third tubular position sub 56 will be disposed within the port 24. The sub 56 will be similar to the previously described positioned sub 28, in that sub 56 will have on the outer diameter a shoulder 58 that will abut the actuator cover means 20, and also containing thread means 60 in order to threadedly engage travel stop 62 to the sub 56. Travel stop 62 will serve a similar purpose to travel stop 36, in that the travel stop 62 will limit the relative lateral movement of rack 4.

As seen in FIG. 1, the actuator cover means 20 has attached thereto an encapsulating means 64, which will also be referred to as encasing means, for encapsulating the actuator shaft 16 and sealing the shaft from the atmosphere as the shaft 16 exits the valve body 66. The encapsulating means 64 will be of a general rectangular box configuration. In the preferred embodiment, at least one side 68 can be constructed of plexiglass so that an operator can determine the relative position of the longitudinal actuator shaft 16.

The encapsulating means 64 is constructed so that in the event of a leak from the valve body 66, through the longitudinal actuator shaft 16, the leak will be contained within the encapsulating means 64 so that no emissions of the regulated medium is possible into the atmosphere.

The encapsulating means 64 will be fastened to the actuator cover means 20 by fastening means 70, not shown. Side walls 72 and 74, and top ceiling 76 can be constructed of metal, and the side walls and ceiling 76 can then be welded together. The plexiglass member will be attached by conventional fastener such as flush-bevelled socket head screws. Seal means, seen generally at 77, are provided for sealing emissions from the valve body 66 along the longitudinal actuator shaft axis, as the shaft exits the valve body 66.

Figure 3:
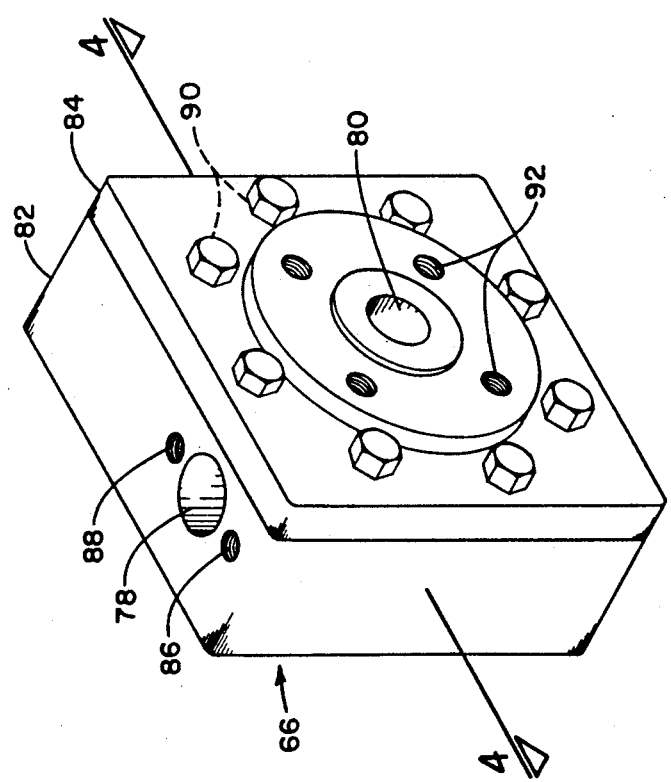
FIG. 3 is a three-dimensional view of the valve body.

Referring now to FIG. 3, the valve body 66 of the present invention is illustrated. The valve body 66 will contain a first aperture 78 and a second aperture 80, and wherein the first and second aperture, 78 and 80 respectfully, intersect at substantially perpendicular angles. The valve body generally comprises a first portion 82 which will be attached to a second portion 84. The first portion 82 will contain a first opening 86 and second opening 88 for the placement of securing means, to be described later, which will fasten the valve body 66 to the encapsulating means 64.

The portion 84 will also contain a plurality of flange openings, shown generally at 90, for the placement of bolting means (not shown) for bolting the first portion 84 and second portion 82. Other flange openings, shown as 92, are for attaching the valve to the pipe 94, as also shown in FIG. 5, which is used to transmit the medium being transported.

Figure 4:
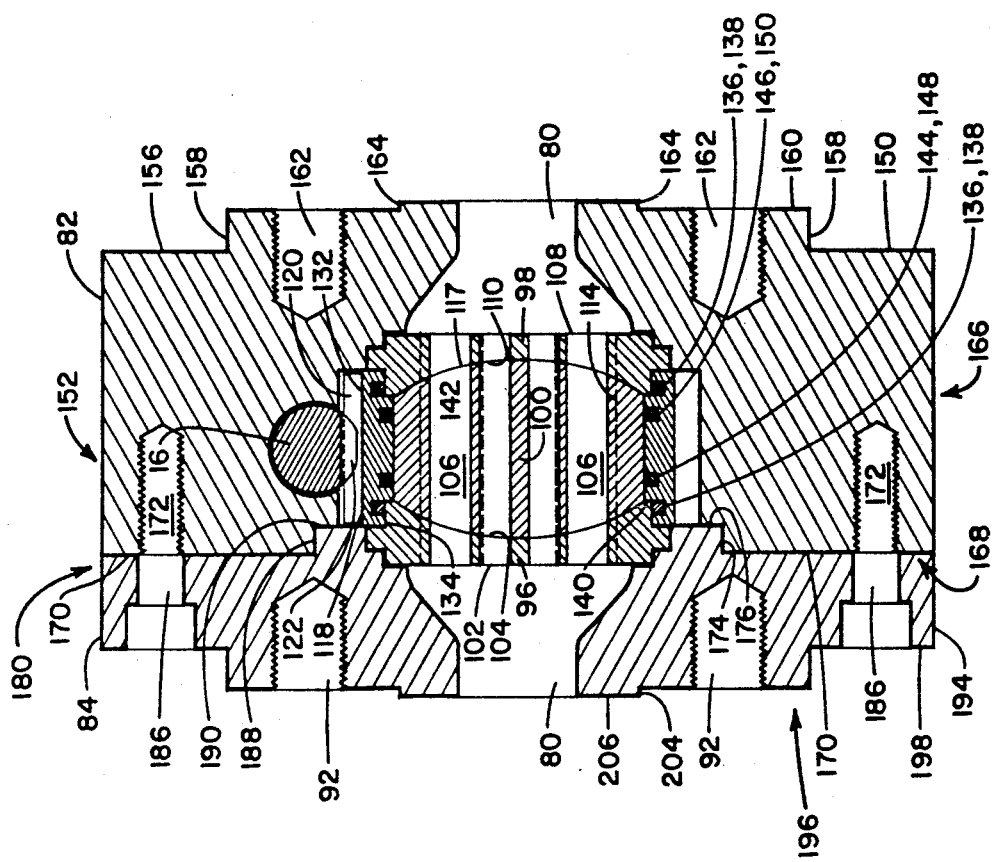
FIG. 4 is a sectional view of the valve taken along line A—A.

Referring to FIG. 4, the first 96, and second 98 valve member, along with the disc means 100 will now be discussed. The second aperture 80, which is also referred to as a passageway 80, will be in communication with the aforementioned pipe 9 such that the medium will flow through pipe 94 and into passageway 80. Disposed within said first valve body member 82, and in communication with passageway 80, will be the first valve member 96 which is a tubular member having a flow face 102 which is essentially flat. Disposed on the second end of the first valve member 96 is concave surface 104.

Disposed through the valve member 96 is a series of openings 106. In the preferred embodiment, the member 96 will contain a first three set arranged about the outer peripheral, and a second set contained within a larger set, as shown in FIG. 5. In the preferred embodiment, the first three set circle will be of larger diameter than the second three set circle.

The second valve member 98 will also be disposed within said valve body member 82 and will contain a flow face 108 which is essentially flat. Referring to FIG. 5, extending on the opposite end of member 98 is concave surface 110. Member 98 will also contain a plurality of openings 112, identical in pattern as that of the openings 106 in the first valve member, i.e. a first three set openings on the outer peripheral, and a second set, three openings, with the second set being smaller in diameter as compared to the first set.

The disc means 100 will now be discussed in more detail. Generally, the disc comprises a cylindrical member 114 with a first convex surface 116 which mates and cooperates with the concave surface 104 of the first valve member 96. The convex surface 116 can also be seen in FIG. 5. Extending axially opposite convex surface 116 is convex surface 117, which will mate and cooperate with the concave surface 110. Disc means will also have contained therethrough a plurality of openings, which like the openings contained on the first and second valve members 96, 98, have a first three member set contained thereon and a second-three member set, with the first member set being located on the outer periphery of the disc and the second set being located within, and with the first set having a larger diameter than the second so that the disc means openings 118 will align with the openings of the first and second valve members, 96, 98.

The disc means 100 also will include a cylindrical gear wheel 118 as shown in FIG. 7, which will contain a plurality of teeth 120. The gear wheel 118 will have contained therein the disc 100. Longitudinal actuator shaft 16 will have contained on the lower end a plurality of cooperating teeth 122. Therefore, the longitudinal actuator shaft 16 and the gear wheel will cooperate similar to a rack and pinion gear wheel.

The gear wheel 118 has disposed therethrough at least one threaded bore, and in the preferred embodiment will have two, 124 and 126, wherein two set screws 128 and 130 will be placed and secured against the disc means 100 inner member. Therefore, as the shaft 16 moves in a longitudinal direction, the teeth 122 will engage and transmit force to the teeth 120. This will, in turn, cause the disc 100 to rotate.

Referring again to FIG. 4, the cylindrical gear wheel 118 will have on the outer diameter, a first surface 132, which as disclosed earlier, will have defined therethrough at least one threaded bore 130. Extending radially inward, the wheel 118 will a have a first surface 134 which will have defined thereon a groove 136 for placement of sealing means 138. Surface 134 terminates at radially flat shoulder 140, which in turns leads to second surface 142, with the second surface 142 having defined therein a first and second groove 144 and 146, for placement of sealing means 148 and 150. The threaded bore 130 with the set screw 128 is also shown in FIG. 4.

Continuing to refer to FIG. 4, the first portion 82 of the valve will now be described. The first portion 82 will contain a lateral wall 152, which is an essentially flat surface, with wall 152 terminating at perpendicular side wall 154, with side wall 154 having a first surface 156 terminating at radial shoulder 158. The shoulder 158 extends to second surface 160, With the surface 160 containing a plurality of threaded openings 162 for placement of threading means (not shown, but known by those of ordinary skill in the art) such as flanking nuts. The surface 160 concludes at radial shoulder 164. The surfaces 156, 160 will have placed thereon a flange face of a piping member, with the piping member being in communication with the passageway 80.

Surface 150 terminates at lateral wall 166, which is an essentially flat surface, with wall 166 terminating at perpendicular side wall 168, side wall 168 including a first surface 170 having a plurality of threaded openings 172 for placement of threaded flanking bolts (not shown). The surface will terminate at inwardly extending radial shoulder 174, with the shoulder extending to surface 176. The surface 176 will have defined thereon main opening 80, as well as the radial shoulder 178.

The first portion of the valve 82, as mentioned previously, will contain the main passageway 80. As contained within the valve, the passageway 80 has a diameter which will be essentially equal to the internal diameter of the pipe to which the valve is coupled. The diameter of the opening 80 will circumferentially increase to match the size of the gear wheel 118.

The second portion of the valve 84 is generally of a rectangular case configuration. The lateral wall 180 terminates at side wall 182 and will have a first surface 184 that contains a plurality of openings 186 for placement of bolt securing means (not shown). The surface 184 will terminate at the radially extending shoulder 188, which in turn extends to second surface 190. Surface 190 terminates at another inwardly extending radial shoulder 192. The second portion of the valve 84 will contain a second lateral wall 194.

Extending perpendicular to the wall 194 is the face 196 which will have defined thereon a first surface 198, with the surface 198 having disposed therethrough the aforementioned openings 186. The surface will extend to radial shoulder 200, with radial shoulder terminating at the second surface 202. Second surface 202 will conclude at radial shoulder 204, with shoulder continuing to the third surface 206.

As seen in FIG. 4, the surface 206 has defined therein the passageway 80, which will be of a diameter of equivalent size as that of the pipe diameter, as previously expressed. The diameter of the opening 80 will circumferentially decrease to match the size of the gear wheel 118.

Figure 6:
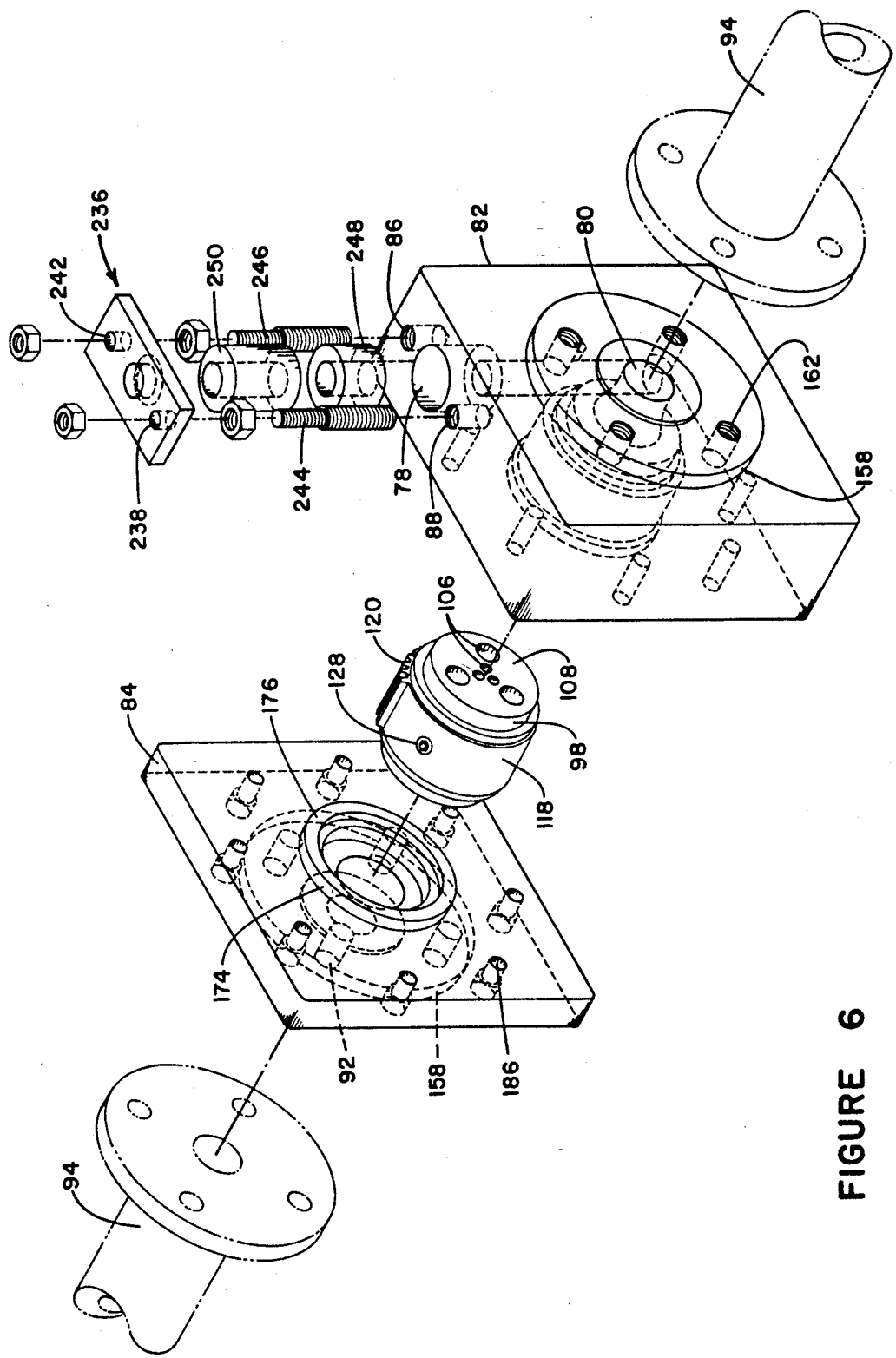
FIG. 6 is a three-dimensional view of the valve showing the spherical, rotative valve member with the fixed disc valve members.

Referring to FIG. 6, the mode of fastening the first portion of the valve body 82 with the second portion 84, as well as showing the seal means 77 and piping 94 is shown. The disc means 100, as the disc means has been assembled, is shown in relation to the disc means, placement in between the valve portions 82, 84. Thus, the teeth 120 of the gear wheel 118 will be oriented so that the teeth 120 will intersect at least partially into the first aperture 78.

Previously discussed longitudinal shaft 16, which is also known as the rack 16, will now be described in greater detail. The rack 16 has a first end 208 and a second end 210 which is best seen in FIG. 7, with the second end 210 containing the previously described teeth 122. Turning back to FIG. 2, the rack 16 will comprise a first cylindrical surface 212 which will have an outer diameter which will be slidably disposed within the inner diameter of the tubular position sub 34. The first surface will terminate at the radial chamfered shoulder 214, which concludes at the second cylindrical surface 216 which will also contain teeth (not shown) which cooperate with the previously mentioned pinion gear wheel 8. The second surface terminates at the radial chamfered shoulder 218 with the surface 218 concluding at the third surface 220, with the third surface having an outer diameter which will be slidably disposed within the tubular position sub 38 and rack 16 will be sealingly engaged with the seal means 54 so that any emissions within the encapsulating means will be precluded from entering the atmosphere.

The third surface 220 will then conclude at radial chamfered surface 222 which in turn extends to fourth surface 224 with fourth surface 224 concluding at the previously described end 210. Surface 224 has delineated thereon the aforementioned teeth 122.

Indicator means 226 will be disposed about the fourth surface 224 of the rack 16 and generally comprises a clamping device 228 fastened by a nut and bolt 230. Further, the nut can have a sharpened end 232 which acts as an indicator as to the relative position of the rack 16. An indication position means 234 can be placed on the yoke member for the operator to determine the relative position of the rack.

The seal means 77 will now be described. Generally, the seal means is arranged about the shaft 16, sometimes known as the rack 16, in the first aperture 78. The seal means includes a plate structure 236 which has openings 238, 240, and 242 defined therein. The opening 240 will have the rack 16 slidably disposed therein, while the openings 238 and 242 will have securing mean 244 and 246? fitted therein for securing the plate structure 236 to the valve body 66.

Packing element means 248, which in the preferred embodiment will be packing purchased under the trade name "Chevron Packing", will also be included, and the means 248 are positioned within first aperture 78. Thus, the packing element means 248 will also be disposed about the rack 16 so that the rack 16 sealingly engages the packing element means 248 and any emissions from the valve members 96 and 98 will be contained within the valve body 66.

A second set of seals 250, and in the preferred embodiment known as o-rings, will also surround the rack 16 and also be placed within the aperture 78.

A second plate structure 252 is also shown, with the plate 252 having openings 254, 256 and 258 which will correspond with the openings 238, 240 and 242. In assembling the aforedescribed structure, it can be seen that the plate structures will be fastened to the valve body 66 by the securing means 244 and 246, thus compressing the seals 250 and 248 as seen in FIG. 6.

OPERATION

The actuator rack 4 will move in a horizontal plane, in response to the diaphragm operator 2 signal. This movement will be transmitted to the pinion gear wheel 8 which will in turn rotate the wheel 8 and the shaft member 12. The teeth 14 will engage and transmit torque to the longitudinal shaft 16 which will in turn cause the shaft 16 (also known as rack) to move longitudinally upward. Note, that if the diaphragm is positioned opposite the position seen in FIG. 1, the rotation of wheel 8 will be in an opposite direction, thus, changing the action from an air-to-open to an air-to-close valve.

The upward movement will then be transmitted to the teeth 120 of the gear wheel 118. As noted earlier, disposed within the gear wheel is the disc means 100. Hence, as the wheel is rotated, the disc means will rotate allowing communication between the openings 112 on the member 110 and openings 106 on the member 96 through the openings 118 which are contained on the cylindrical member 114.

As will be appreciated by those skilled in the art, as the rack 4 is retracted back into the diaphragm operator 2, an opposite rotation movement will be imparted to the pinion gear wheel 8, so that the shaft will move in an upward movement, and the disc means will rotate in an opposite direction, which will close openings 118 relative to openings 106 and 112, and create a metal to metal seal the between the disc member 100 and the members 110 and 96. Also, in the event a piece of loose solid material has become lodged within any of the openings, the hardened and sharpened metal edges contained on member 110 and 96 will act to crush the material.

The operator will also be able to determine the relative position of the shaft 16 by comparing the position of the sharpened end 232 of the nut and bolt 230, and the indication position means 234 which can be a piece of metal strip with indentations marked in a suitable length of measurement thereon.

Thus, it is seen that the apparatus of the present invention readily achieve the ends and objects mentioned as well as those inherent therein and not specially mentioned. While certain preferred embodiments of the invention have been illustrated and described for the purposes of the present disclosure, numerous changes in the arrangement and construction of parts and steps may be made by those skilled in the art, which changes are encompassed within the scope and spirit of the present invention as defined by the appended claims.

I claim:

1. A valve comprising:
   a valve body with a first aperture defined therein, and a second aperture defined therein, said first aperture and second aperture being formed at perpendicular angles, and wherein said first and second apertures intersect;
   a valve rack slidably disposed within said second aperture;
   a first valve member disposed within said valve body, said valve member having defined therethrough a plurality of ports;
   a second valve member disposed within said valve body, said valve member having defined therethrough a plurality of ports;
   disc means, located between said first and second valve members, for allowing communication between the ports of said first valve member and said second valve member; and
   a tubular pinion member having said disc means disposed therethrough, said tubular pinion member cooperating with said rack so that as said rack moves in a longitudinal direction, said tubular pinion member rotates allowing the openings contained on said disc means to become aligned with the ports on said first and second valve members.

2. The valve of claim 1, further comprising:
   actuating means for actuating movement of said rack in either an upward or downward longitudinal movement; and
   encapsulating means, attached between said actuating means and said valve body, for encapsulating said rack and providing a seal between the rack and the atmosphere.

3. The valve of claim 2, wherein said encapsulating means includes:
a seal body member having a first end and a second end, and wherein said first end has defined therein a first port and second end has defined therein a second port so that said rack is disposed therethrough; and
first seal means, disposed about said rack in the first and second port, for sealing emissions from said valve.

4. The valve of claim 3, wherein said first seal means includes:
packing element seals disposed about said rack in the first port;
a plate structure having at least one hole and an aperture bored therethrough so that said valve rack and packing element seals are disposed therethrough;
at least one set screw secured though the hole of the plate structure.

5. The valve of claim 4, further comprising:
actuator cover means for sealing said actuating from the atmosphere;
and wherein said actuating means contains an actuating rack, said actuating rack being responsive to a pneumatic control device, and a pinion gear wheel rotably attached to said actuator cover means, said pinion gear wheel and said actuating rack cooperating so that as the rack moves in a horizontal direction, said pinion gear wheel will rotate.

6. The valve of claim 5, wherein said actuator cover means includes:
an actuator cover structure;
a first, second and third passageways defined on said cover structure; and
first and second travel stops, placed in said first and second passageways, which cooperate with said first and second racks so that as the racks reaches a certain extent of travel, movement of the rack will be stopped.

7. The valve of claim 2, wherein said valve body comprises:
a first and second member, said first and second member having at least one aperture which are aligned so that a fastener can be placed therethrough to mate said first and second member together.

8. The valve of claim 2, wherein said encapsulating means is constructed of plexiglass; and
said rack has attached thereto indicator means for determine the position of said rack with respect to said encapsulating means.

9. The valve of claim 4, wherein said rack has defined thereon a lock-out pin aperture for placement of a lock-out pin so that longitudinal movement of said rack is prevented.

10. The valve of claim 9 further comprises:
a shaft member positioned within said third passageway of said actuator cover structure, said shaft member having an opening therethrough so that said rack can be slidable positioned; and
seal means, located on said shaft member, for sealing said rack within said actuator cover means.

11. An apparatus for regulating the flow of a medium, comprising:
a valve body with a first and second passageway defined therein:
a shaft disposed within said first passageway of said valve body, said shaft containing a plurality of teeth defined thereon;
a valve member comprising a first portion and a second portion contained within said second passageway, said first and second portion containing a plurality of apertures and wherein said first and second portion has a first end and a second end;
means, operably associated with said shaft, for selectively communicating the apertures of the first portion and the second portion, wherein said communicating means includes:
a cylindrical member having a first and second end, said cylindrical member having a plurality of apertures defined therein and a pinion member containing a plurality of teeth, said pinion member having an internal diameter wherein said cylindrical member is secured and wherein as said shaft is moved in a longitudinal direction by said actuating means, the cylindrical member is rotated so that the apertures of said valve member and said cylindrical member are aligned so as to allow communication between said first and second portion; and
actuating means for actuating movement of said shaft in a longitudinal; direction.

12. The apparatus of claim 11, further comprising:
encasing means for encasing said shaft and providing a seal between said shaft and the atmosphere, and wherein said encasing means includes:
a seal body member having a first end and a second end, and wherein said first end has defined therein a first port and second end has defined therein a second port st that said rack is disposed therethrough; and
first seal means, disposed about said rack in the first and second port, for sealing emissions from said valve and wherein the first seal means includes packing element seals disposed about said rack in the first port, a plate structure having at least one hole and an aperture bored therethrough, and at least one set screw secured through the hole of the plate structure and having said shaft with said packing elements being disposed therein.

13. The apparatus of claim 12, wherein the first side of the first portion and second side of said second portion of said valve member has a concave surface and the second side of the first portion and the first side of said second portion is essentially flat; and
wherein, the first and second end of said cylindrical member has a convex surface so that the concave surfaces of said first and second portion cooperate with the convex surfaces of said cylindrical member.

14. The apparatus of claim 13, further comprising:
actuator cover means for sealing said actuating from the atmosphere;
and wherein said actuating means contains an actuating rack, said actuating rack being responsive to a pneumatic control device, and a pinion gear wheel rotably attached to said actuator cover means, said pinion gear wheel and said actuating rack cooperating so that as the rack moves in a horizontal direction, said pinion gear wheel will rotate.

15. The apparatus of claim 13, wherein said encasing means has at least one side constructed of plexiglass; and
wherein said shaft has attached thereto indicator means for determine the position of said rack with respect to said encasing means.

16. The apparatus of claim 13, wherein the first and second portion of said valve member and said cylindrical member are constructed of a metal.

* * * * *